US 6,663,096 B2

(12) United States Patent
Heath et al.

(10) Patent No.: US 6,663,096 B2
(45) Date of Patent: Dec. 16, 2003

(54) CUTTING BOARD FOR FOOD PRODUCTS AND METHOD OF FABRICATING SAME

(75) Inventors: Derek E. Heath, 5410 E. Harbor Village Dr., Vero Beach, FL (US) 32967; Steve Treadway, Johnson City, TN (US)

(73) Assignee: Derek E. Heath, Vero Beach, FL (US)

( * ) Notice: Subject to any disclaimer, the term of this patent is extended or adjusted under 35 U.S.C. 154(b) by 26 days.

(21) Appl. No.: 10/123,471

(22) Filed: Apr. 16, 2002

(65) Prior Publication Data

US 2003/0193123 A1 Oct. 16, 2003

(51) Int. Cl.⁷ .................................................. B23Q 3/00
(52) U.S. Cl. .................... 269/289 R; 451/552; 451/364; 269/900; 269/302.1
(58) Field of Search ................... 269/289 R, 302.1, 269/900; 451/552, 555, 461, 364

(56) References Cited

U.S. PATENT DOCUMENTS

| 2,204,453 A | 6/1940 | Siegert |
| 2,816,588 A | 12/1957 | Miron |
| 2,826,879 A | 3/1958 | Evans |
| 2,836,213 A | 5/1958 | Stevens |
| 4,272,925 A | 6/1981 | Graves |
| 4,759,153 A | 7/1988 | Cohen |
| 5,233,793 A | 8/1993 | Dandurand |
| D348,374 S | 7/1994 | Dandurand |
| 5,440,953 A | 8/1995 | Gangelhoff et al. |
| 5,527,022 A * | 6/1996 | Gibson .................. 269/13 |
| 5,658,184 A | 8/1997 | Hoopman et al. |
| 5,683,292 A | 11/1997 | Young |
| 5,860,641 A | 1/1999 | Heath |

FOREIGN PATENT DOCUMENTS

| EP | 0 986 956 A1 | 3/2000 |
| EP | 1 033 930 B1 | 9/2000 |
| GB | 2 038 614 A | 7/1980 |
| JP | 08 206022 A | 8/1996 |

* cited by examiner

Primary Examiner—Lee D. Wilson
(74) Attorney, Agent, or Firm—Alston & Bird LLP

(57) ABSTRACT

A cutting board for food products which is composed of a plurality of abrasive conical inserts arranged in parallel rows on a support so that a knife blade may be drawn along the channel formed between adjacent rows to sharpen the knife blade on both sides by contact with the inserts. The inserts are separately fabricated and mounted in tapered openings formed through the support.

20 Claims, 2 Drawing Sheets

CUTTING BOARD FOR FOOD PRODUCTS AND METHOD OF FABRICATING SAME

BACKGROUND OF THE INVENTION

The present invention relates to a cutting board for cutting food products, and a method of fabricating the same.

Cutting boards of the described type typically comprise a block of hardwood, or a rigid sheet of hard plastic or other similar material. The food product is placed upon the cutting board, and the knife or cleaver is drawn through the product while the product is held by hand or some other instrument. When the knife or cleaver becomes dull, it is sharpened on a separate sharpening stone or tool.

U.S. Pat. No. 5,860,641 discloses an improved cutting board, which comprises a generally flat support surface with a plurality of cone shaped inserts formed of an abrasive material and mounted on the support surface. The inserts are mounted in a side by side arrangement which defines a plurality of parallel rows of inserts which define channels along which the knife blade may be drawn, such that the knife blade is sharpened on both sides by contact with the inclined surfaces of the inserts of adjacent rows.

The present invention is directed to an improved construction of a cutting board of the type described in the above referenced patent, and to an improved method of fabricating the same.

SUMMARY OF THE INVENTION

The above objects and advantages of the present invention are achieved by the provision of a cutting board of the type described in the above referenced patent, and wherein the inserts are separately formed of an abrasive material and are mounted in openings formed in the support. The inserts have inclined peripheral surfaces, and the openings are configured to closely receive a bottom portion of the inserts therein, and the inserts are preferably held in place by a plug or by an epoxy resin which is fixed in a cavity or space which underlies the bases of the inserts.

To fabricate the board in accordance with one preferred embodiment of the invention, a cavity is formed in the under surface of the support and so as to terminate short of the top surface and thereby define a generally flat downwardly facing internal shoulder and a bridge formed between the shoulder and the top surface. The openings are then formed through the bridge, and the inserts are then placed in the openings. Finally, to secure the inserts in the desired position, a plug is fixed within the cavity so as to underlie the inserts.

In another preferred embodiment, conical openings are drilled completely through the support, and cone shaped inserts are inserted into the openings so that the bases of the inserts are disposed above the under surface of the support to leave a space therebetween. The space is then filled with an epoxy resin or the like, which upon hardening, locks the inserts in place.

BRIEF DESCRIPTION OF THE DRAWINGS

Some of the objects and advantages of the present invention having been stated, others will appear as the description proceeds, when considered in conjunction with the accompany drawings, in which.

DETAILED DESCRIPTION OF THE PREFERRED EMBODIMENTS

Figure 1:
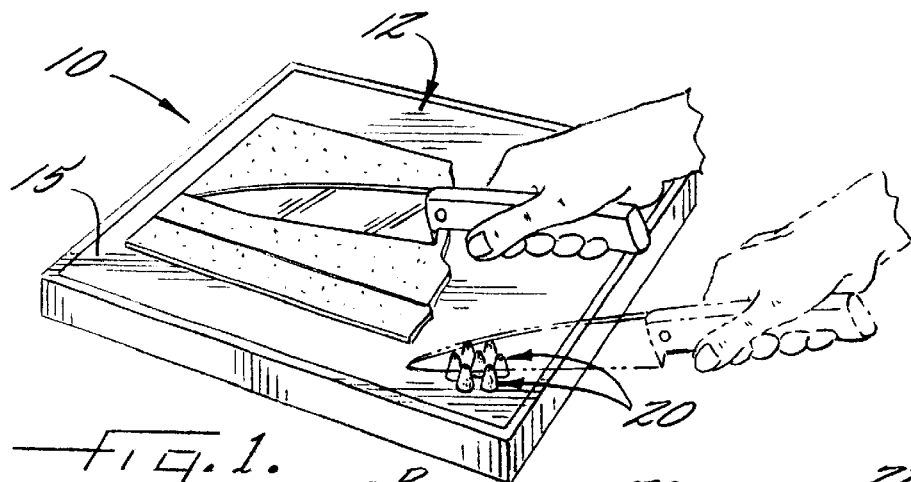
FIG. 1 is a perspective view of a cutting board which embodies the features of the present invention.

FIG. 1 illustrates at 10 a cutting board which embodies the features of the present invention. In the illustrated embodiment, the board includes a rectangular, generally flat support 12 which defines an under surface 14 and a top surface 15 which are parallel to each other. The support 12 can be fabricated from wood or plastic, but it is preferably molded or otherwise formed as an integral unit from a suitable ceramic or similar material, such as Corian® as sold by duPont.

The support 12 mounts a plurality of inserts 20 formed of an abrasive material. The inserts 20 are each of generally conical configuration and have a circular base 21 and a rounded vertex 22. A peripheral surface 23 extends downwardly from the vertex to the base, and in the illustrated embodiment, the peripheral surface 23 is in the form of a section of a cone. The conical inserts 20 typically have a base diameter of about ¼ inch, and a height of about ⅜ inch. Further, the conical inserts are arranged in three groups of rows A, B, and C as further described below.

The inserts 20 are positioned in a side by side relation on a small portion of the total area of the support surface 15 so as to define the rows A, B and C of inserts, and wherein each pair of adjacent rows defines a channel along which a knife blade may be drawn and such that both sides of the knife blade are sharpened by their contact with the inclined peripheral surfaces 23 of the inserts of the adjacent rows, note the dashed line illustration in FIG. 1.

Figure 2:
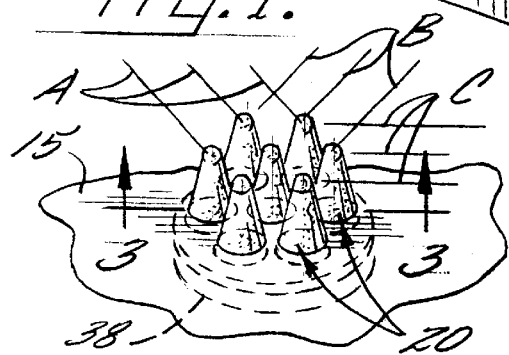
FIG. 2 is an enlarged fragmentary perspective view of a portion of the cutting board shown in FIG. 1.
Figure 3:
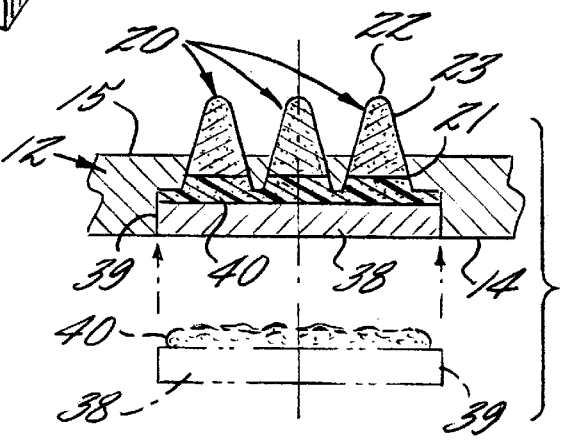
FIG. 3 is a sectional view taken substantially along the line 3—3 of FIG. 2.
Figure 5:
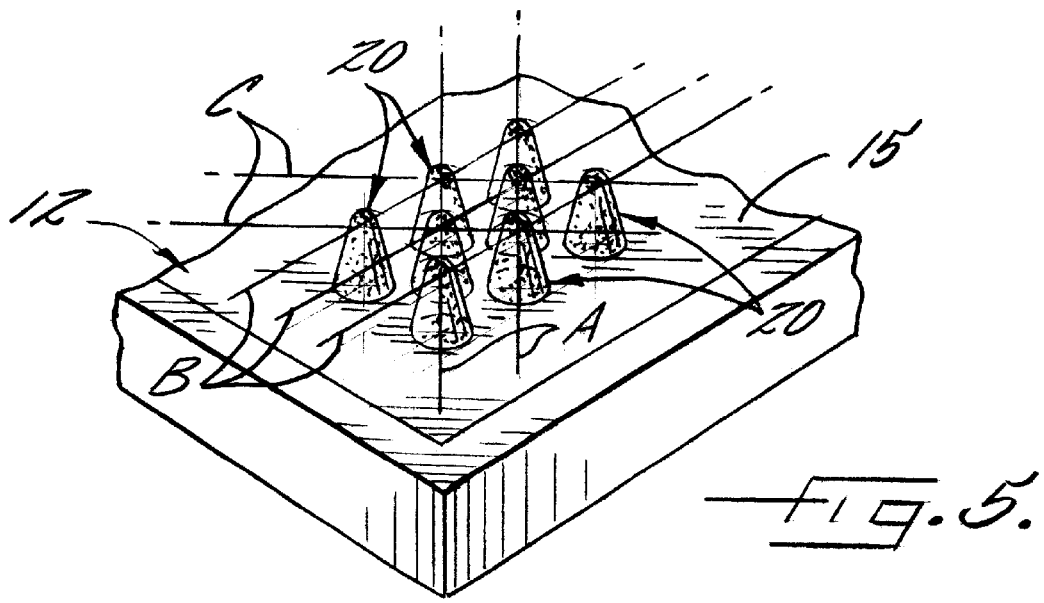
FIG. 5 is a fragmentary perspective view of a second embodiment of the invention.

FIGS. 1–3 illustrate an embodiment wherein seven inserts 20 are mounted in three groups of rows A, B, and C. The groups of rows extend in different directions which are angularly spaced apart by 60° when viewed in plan. Also, the inserts of each row of each group are aligned with respective inserts of the adjacent rows of the same group along lines which are at a 60° angle with respect to the direction of the rows of the group. Other configurations and relative positioning for the inserts may be employed, such as those illustrated in U.S. Pat. No. 5,860,641, the disclosure of which is incorporated herein by reference. Also, another possible configuration of the rows is illustrated in FIG. 5 as described below.

The inserts 20 may be fabricated by one of at least two otherwise conventional ceramic manufacturing processes. A first such process, referred to as the standard ceramic dry pressing method, involves the following steps:

A. The ceramic powder is placed in a female mold of the desired part. The powder can include a suitable colorant, if desired. B. A press is activated so as to compress the powder into the mold under sufficient pressure to form the powder into a solid part which conforms to the shape of the mold.

C. The part is removed from the mold and placed in an oven where the part is fired at about 3000 degrees F. for 20–24 hours to achieve proper fusion.

D. The part is then polished to remove any rough edges or imperfections on the part, which can be performed by hand, or by tumbling, or by sandblasting.

E. The parts are finally inspects and sent to assembly or inventory.

A second manufacturing process involves the casting of the inserts, and includes the following steps:

A. The ceramic powder and a suitable colorant are mixed with water to produce a paste (approximately 2 parts powder to 1 part water).

B. The paste is poured into a female mold of the part, and the mold is vibrated for 20–30 seconds to completely fill the mold and remove any air pockets that may be trapped in the mold.

C. Curing in the mold takes up to 24 hours at room temperature, or heat can be applied to speed the cure time.

D. After curing, the parts are removed from the mold and inspected for defects caused by air bubbles or an improperly filed mold. Any excess material can also be trimmed.

E. The parts are next heat treated, at approximately 3000 degrees F. for 20–24 hours, to achieve proper fusion of the ceramic mixture.

F. The parts are next polished to remove any rough edges or imperfections on the parts, which can be performed by hand, or by tumbling, or by sandblasting.

G. The parts are finally inspected and sent to assembly or inventory.

In the embodiment of FIGS. 1–3, and as illustrated in FIGS. 4A–4D, the inserts 20 are assembled to the support 12 by first drilling or otherwise forming a cavity 30 in the support 12 which extends into the under surface 14 and terminates short of the top surface 15 so as to define a generally flat downwardly facing shoulder 32 and a bridge 34 formed between the shoulder 32 and the top surface 15.

Figure 4A:
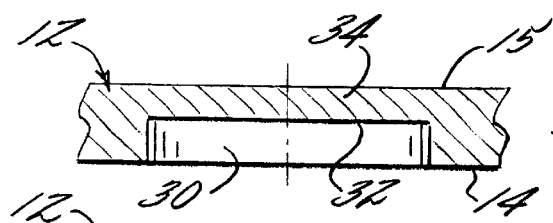
FIGS. 4A–4D are sectional views similar to FIG. 3 and illustrating the steps of a process of fabricating the board illustrated in FIGS. 1–3.
Figure 4B:
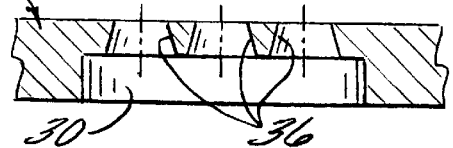
Figure 4C:
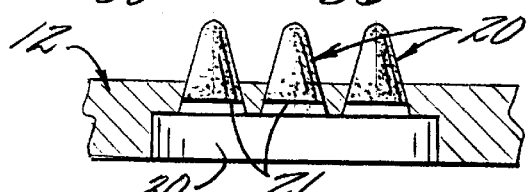
Figure 4D:
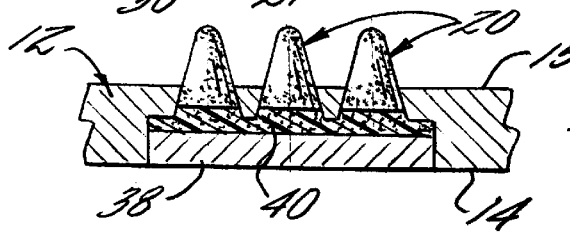

A plurality of tapered openings 36 are then drilled through the bridge, note FIG. 4B, with the openings being tapered so as to closely match the cross sectional outline of the portion of the conical inserts 20 adjacent their bases. The inserts 20 are then positioned in respective openings, note FIG. 4C, so that the vertexes extend above the top surface 15 of the support.

The openings 36 are positioned such that the inserts 20 are disposed in the side by side relation as described above, and so as to form channels along which a knife blade may be drawn such that the knife blade is sharpened on both sides by contact with the inclined peripheral surfaces of the adjacent inserts.

The inserts 20 are next secured in the respective openings by fixing a plug 38 within the cavity 30 so as to underlie the bases of the inserts 20. Preferably, the plug 38 has a circular side wall 39 which closely matches the diameter of the cavity 30, and when in place, the bottom surface of the plug is substantially coplanar with the under surface 14 of the support, note FIGS. 3 and 4D. Also, a suitable epoxy adhesive 40 or the like may be placed on the upper surface of the plug 38, or on the bases of the inserts and the shoulder 32, so as to lock the plug in its assembled position.

FIGS. 5 and 6A–6C illustrate a second embodiment of the invention. In this embodiment, a plurality of tapered or conical openings 50 are drilled completely through the support 12 in a predetermined pattern. The openings 50 are configured and sized so as to closely match the configuration and size of a portion of the conical inserts 20 adjacent their bases 21, so that upon the inserts being inserted into respective ones of the openings, the bases of the inserts are disposed above the under surface 14 of the support 12 to leave a space 52 therebetween.

Figure 6A:
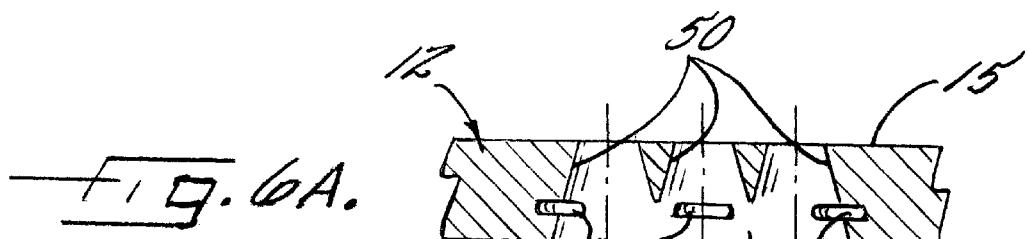
FIGS. 6A–6C are sectional views illustrating the steps of a process of fabricating the board illustrated in FIG. 5.
Figure 6B:
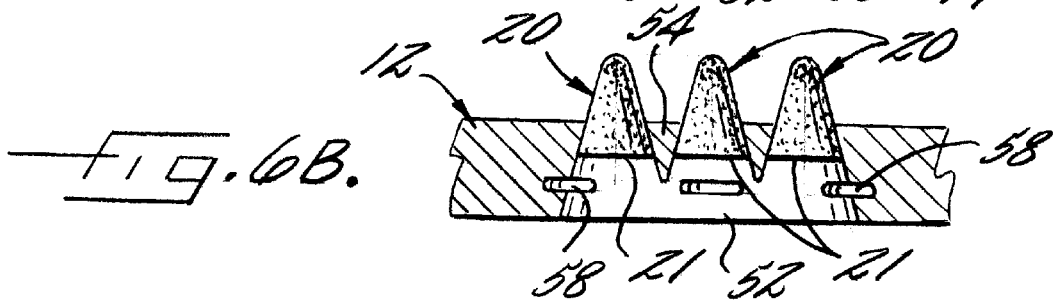
Figure 6C:
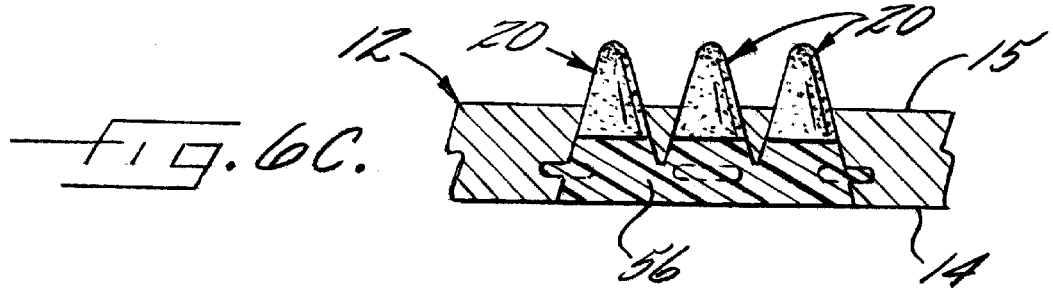

As best seen in FIG. 6A, the tapered openings 50 are sized and positioned so that the openings overlap each other adjacent the under surface 14 of the support, and so that the openings 50 laterally communicate with each other adjacent to under surface 14 and leave a perforated bridge 54 adjacent the top surface 15.

To secure the inserts 20 in the openings 50, the space 52 between the bases 21 of the inserts and the under surface 14 is filled with an epoxy resin 56 or the like. Also, to lock the resin in place upon hardening, a lateral slot .58 may be formed in the side of at least some of the openings. The liquid resin flows into each slot, and upon hardening, the resin forms a locking tab in the slot and the hardened resin is held against rearward removal.

In the embodiment of FIGS. 5 and 6A–6C, eight inserts 20 are mounted on the support 12 in a pattern which defines rows extending in three directions, A, B, and C, which are oriented 45° apart when viewed in plan. A knife blade may be drawn along the channels formed between adjacent rows of any of these three directions, to concurrently sharpen both sides of the blade by contact with the conical surfaces of the inserts.

In the illustrated embodiments, the inserts 20 occupy an area which represents a minor portion of the total area of the top surface 15 of the support 12. However, the illustrated number of inserts may vary, from as few as two or three to a much larger number, so that the covered area may be decreased or increased from that illustrated in the drawings.

While the term "abrasive" has been used herein to describe the texture of the surface of the inserts, it will be appreciated that this term is intended to encompass a surface texture which is relatively smooth to the touch, and so as to impart more of a burnishing action to the knife blade edge as it is drawn along one of the channels.

In the drawings and specification, there has been set forth a preferred embodiment of the invention, and although specific terms are employed, they are used in a generic and descriptive sense only and not for purposes of limitation.

What is claimed is:

1. A method of fabricating a cutting board for cutting food products and which is characterized by the ability to sharpen the knife during use, and comprising the steps of fabricating a generally flat support which defines an under surface and a top surface which are generally parallel to each other, fabricating a plurality of inserts formed of an abrasive material, with each of the inserts having a base, a vertex located centrally above the base, and a peripheral surface which extends downwardly from said vertex to said base in an inclined direction, forming a plurality of openings extending through said support, with the openings being configured to closely match the cross sectional outline of the inserts and being sized so that the inserts may be inserted into respective openings and retained in a predetermined position with the vertexes extending above the top surface of the support, and wherein the openings are positioned such that upon the inserts being so inserted into the openings the inserts are disposed in a side by side relation and define at least one channel between adjacent inserts along which a knife blade may be drawn such that the knife blade is sharpened on both sides by contact with the inclined peripheral surfaces of the adjacent inserts, inserting the inserts into respective ones of the openings so as to assume said predetermined position, and then securing said inserts in said openings.

2. The method of claim 1 wherein the inserts are each of generally conical configuration and have a circular base and a rounded vertex.

3. The method of claim 2 wherein the openings have a configuration and size which closely match the configuration and size of a portion of the inserts adjacent their bases.

4. The method of claim 1 wherein the inserts define a plurality of parallel rows of inserts, with one of said channels being formed between each pair of adjacent rows.

5. The method of claim 1 wherein the openings each define an upper portion immediately adjacent the top surface of said support, with the upper portions having a configuration and size which closely match the configuration and size of a portion of the inserts adjacent their bases, so that upon the inserts being inserted into respective ones of the openings, the bases of the inserts are disposed above the under surface of the support to leave a space therebetween.

6. The method of claim 5 wherein the step of securing said inserts in said openings includes filling said space with a hardenable liquid material.

7. The method of claim 6 wherein the step of forming a plurality of openings includes forming a lateral slot in the side of at least some of the openings within said space, and so that the hardenable liquid material flows into each lateral slot and, upon hardening, locks the material in the space.

8. A method of fabricating a cutting board for cutting food products and which is characterized by the ability to sharpen the knife during use, and comprising the steps of
   fabricating a generally flat support which defines an under surface and a top surface which are generally parallel to each other,
   fabricating a plurality of inserts formed of an abrasive material, with each of the inserts having a base, a vertex located centrally above the base, and a peripheral surface which extends downwardly from said vertex to said base in an inclined direction,
   forming a cavity in the support which extends into the under surface of the support and terminates short of the top surface so as to define a generally flat downwardly facing internal shoulder and a bridge formed between the shoulder and the top surface,
   forming a plurality of openings extending through said bridge, with the openings being tapered so as to closely match the cross sectional outline of the inserts and being sized so that the inserts may be inserted into respective openings and retained in a predetermined position with the vertexes extending above the top surface of the support, and wherein the openings are positioned such that upon the inserts being so inserted into the openings the inserts are disposed in a side by side relation and define at least one channel between adjacent inserts along which a knife blade may be drawn such that the knife blade is sharpened on both sides by contact with the inclined peripheral surfaces of the adjacent inserts,
   inserting the inserts into respective ones of the openings so as to assume said predetermined position, and then securing said inserts in said openings.

9. The method of claim 8 wherein the securing step includes fixing a plug within said cavity so as to underlie said inserts.

10. The method of claim 9 wherein the step of fixing a plug within said cavity includes placing an epoxy resin adhesive between the cavity and the plug.

11. A cutting board for cutting food products and which is characterized by the ability to sharpen the knife during use, and comprising
    a generally flat support which defines an under surface and a top surface which are generally parallel to each other,
    a plurality of inserts formed of an abrasive material, with each of the inserts having a base, a vertex located centrally above the base, and a peripheral surface which extends downwardly from said vertex to said base in an inclined direction,
    a plurality of openings extending through said support,
    said inserts being mounted in respective ones of the openings in a predetermined position with the vertexes extending above the top surface of the support, and
    wherein the openings and inserts are positioned such that the inserts are disposed in a side by side relation and define at least one channel between adjacent inserts along which a knife blade may be drawn such that the knife blade is sharpened on both sides by contact with the inclined peripheral surfaces of the adjacent inserts.

12. The cutting board of claim 11 wherein the inserts are each of generally conical configuration and have a circular base and a rounded vertex.

13. The cutting board of claim 12 wherein the openings are tapered so as to closely receive a portion of the inserts adjacent their bases.

14. The cutting board of claim 13 wherein the bases of the inserts are disposed above the under surface of the support to define a space therebetween.

15. The cutting board of claim 14 wherein the space is filled with an epoxy resin.

16. The cutting board of claim 11 wherein the inserts occupy an area which represents a minor portion of the total area of the top surface of the support.

17. A cutting board for cutting food products and which is characterized by the ability to sharpen the knife during use, and comprising
    a generally flat support which defines an under surface and a top surface which are generally parallel to each other,
    a plurality of inserts formed of an abrasive material, with each of the inserts having a base, a vertex located centrally above the base, and a peripheral surface which extends downwardly from said vertex to said base in an inclined direction,
    a cavity in the support which extends into the under surface of the support and terminates short of the top surface so as to define a generally flat downwardly facing internal shoulder and a bridge formed between the shoulder and the top surface,
    a plurality of openings extending through said bridge,
    said inserts being mounted in respective ones of the openings in a predetermined position with the vertexes extending above the top surface of the support, and
    wherein the openings and inserts are positioned such that the inserts are disposed in a side by side relation and define at least one channel between adjacent inserts along which a knife blade may be drawn such that the knife blade is sharpened on both sides by contact with the peripheral surfaces of the adjacent inserts.

18. The cutting board of claim 17 further comprising a plug fixed within said cavity so as to underlie said inserts.

19. The cutting board of claim 18 wherein said plug has a bottom surface which is substantially coplanar with said under surface of said support.

20. The cutting board of claim 17 wherein the openings and inserts are positioned such that the inserts define a plurality of parallel rows of inserts, with one of said channels being formed between each pair of adjacent rows.

* * * * *